(No Model.)
S. A. RICE & W. S. OVENS.
MACHINE FOR CLEANING FRUIT.
No. 256,598. Patented Apr. 18, 1882.
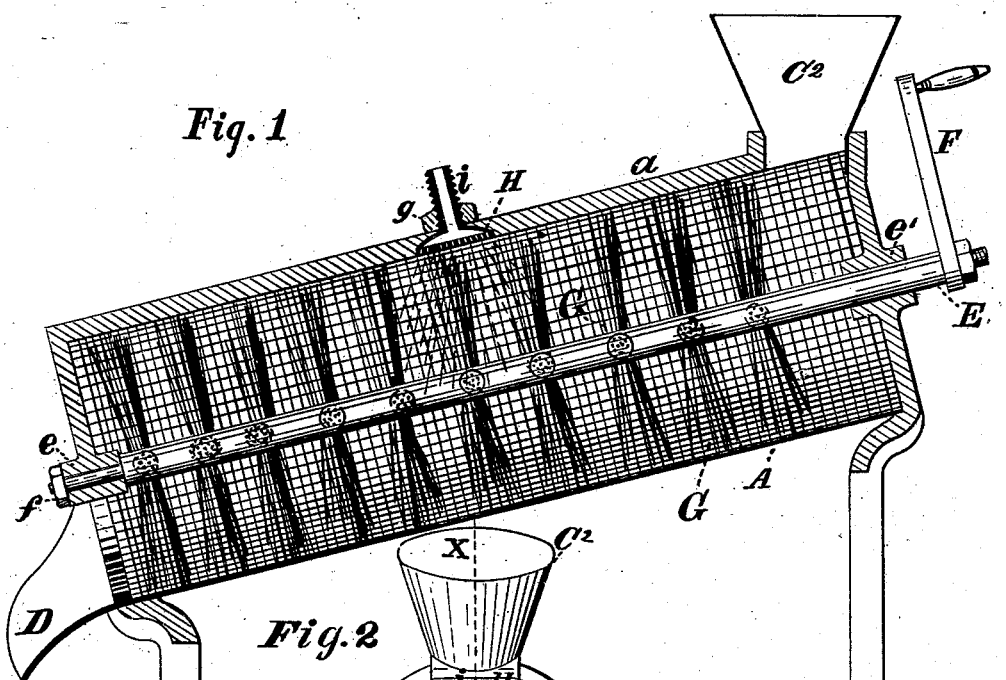
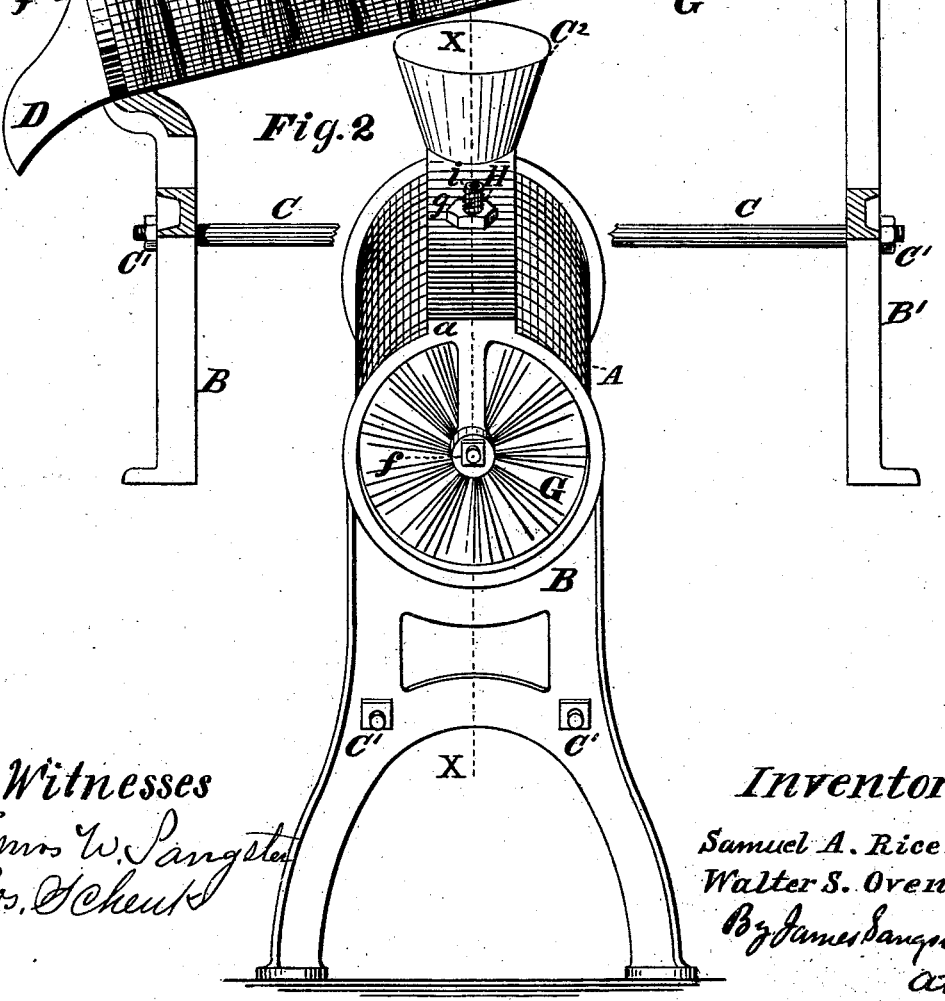
Witnesses
Inventors.
Samuel A. Rice.
Walter S. Ovens.

UNITED STATES PATENT OFFICE.

SAMUEL A. RICE AND WALTER S. OVENS, OF BUFFALO, N. Y., ASSIGNORS TO CHAS. E. BENEDICT AND GEORGE B. WEBSTER, OF SAME PLACE.

MACHINE FOR CLEANING FRUIT.

SPECIFICATION forming part of Letters Patent No. 256,598, dated April 18, 1882.

Application filed August 10, 1881. (No model.)

*To all whom it may concern:*

Be it known that we, SAMUEL A. RICE and WALTER S. OVENS, both citizens of the United States, residing in Buffalo, in the county of Erie and State of New York, have jointly invented certain new and useful Improvements in Machines for Cleaning Fruit, of which the following is a specification.

The object of this invention is to produce the means for cleaning currants, raisins, or other fruit; and it consists of a reticulated case or cylinder, provided with a hopper, an outlet-spout, a nozzle for supplying water, and a series of brushes, all of which will be more clearly understood by reference to the drawings, in which—

Figure 1 is a vertical longitudinal section through line X X, Fig. 2; and Fig. 2 represents a front view of the machine, the outlet-spout being left off.

A represents the reticulated cylinder, made of woven wire or its equivalent, and joined or secured at the top to a rib, $a$. It is supported in a frame, B B', to which it is fastened by bolts or other usual means, and is arranged so as to incline more or less, as shown in Fig. 1. The frame B B' is held together in the usual way by the ordinary binding-rods, C, and nuts C'.

$C^2$ represents a hopper into which the fruit or other material is placed.

D is the outlet-spout; E, a shaft set in bearings $e\ e'$, and kept in place by a nut, $f$. To this shaft is secured a handle, F, for turning it, or when driven by power a pulley may be used. To the shaft E is fastened a series of circular brushes, G, which brushes may be arranged as shown or in the form of a spiral, or in any other well-known way, and are made of bristles or other suitable material used for such purposes.

To the bar or supporting-rib $a$ is secured by means of a nut, $g$, a perforated nozzle, H, for spraying water over the fruit when required. It is provided with a screw, $i$, to receive the nut $g$, and a hose or pipe for supplying the water.

In operating the machine, the fruit is put in through the hopper $C^2$, and the brush is turned rapidly enough to clean the fruit and force it gradually through the cylinder and out from the spout D, while the impurities and dirt sift through the meshes of the cylinder.

We claim as our invention—

In a fruit-cleaning machine, the reticulated cylinder A, provided with a hopper, $C^2$, outlet-spout D, and nozzle H, in combination with the shaft E and brushes G, substantially as and for the purposes specified.

SAMUEL A. RICE.
WALTER S. OVENS.

Witnesses:
JAMES SANGSTER,
AMOS W. SANGSTER.